United States Patent [19]

Byrd, Jr.

[11] 4,393,569

[45] Jul. 19, 1983

[54] METHOD OF INSTALLING DEFRACTORY CERAMIC FIBER MODULE

[75] Inventor: Carlisle O. Byrd, Jr., Houston, Tex.

[73] Assignee: J T Thorpe Company, Houston, Tex.

[21] Appl. No.: 277,877

[22] Filed: Jun. 26, 1981

Related U.S. Application Data

[62] Division of Ser. No. 146,116, May 2, 1980, abandoned.

[51] Int. Cl.[3] .......................... B23P 3/00; B23P 19/04

[52] U.S. Cl. ........................................ 29/460; 138/149; 432/234

[58] Field of Search ............. 29/460, 455 R; 138/147, 138/149, 140; 432/234, 236

[56] References Cited

U.S. PATENT DOCUMENTS

| | | | |
|---|---|---|---|
| 3,379,423 | 4/1968 | Bloom et al. | 432/234 X |
| 3,486,533 | 12/1969 | Doherty et al. | 138/147 |
| 3,665,968 | 5/1972 | De Putter | 138/141 |
| 3,820,947 | 6/1974 | Boto et al. | 432/234 |
| 3,848,034 | 11/1974 | Schaefer | 432/234 X |
| 3,899,913 | 8/1975 | Schlosser | 29/455 R X |
| 3,921,273 | 11/1975 | Kondo et al. | 29/455 R X |
| 3,952,470 | 4/1976 | Byrd | 52/509 |
| 4,001,996 | 1/1977 | Byrd | 52/509 |
| 4,015,636 | 4/1977 | Van Fossen | 138/149 |
| 4,093,760 | 6/1978 | O'Malley | 432/234 X |
| 4,140,483 | 2/1979 | Errington | 432/234 |
| 4,255,127 | 3/1981 | Skifano et al. | 432/234 X |
| 4,338,380 | 7/1982 | Erickson | 29/460 X |

FOREIGN PATENT DOCUMENTS 1342891 1/1974 United Kingdom .

*Primary Examiner*—Charlie T. Moon

*Attorney, Agent, or Firm*—Pravel, Gambrell, Hewitt, Kirk & Kimball

[57] ABSTRACT

Fluid containing support members of walking beam mechanisms for moving beams and the like in furnaces are insulated with refractory ceramic fiber blanket modules. The modules are wrapped about the support members and attched with attachment members. Protective coverings are provided to reduce exposure of the fiber materials from slag from the beams.

13 Claims, 6 Drawing Figures

METHOD OF INSTALLING DEFRACTORY CERAMIC FIBER MODULE

This is a division, of application Ser. No. 146,116, filed May 2, 1980 now abandoned.

FIELD OF THE INVENTION

The present invention relates to insulation of support rails in furnaces with modular refractory fiber insulation modules.

DESCRIPTION OF PRIOR ART

In steel mills, furnaces for steel members such as slabs and the like have been provided with supports or tubes so that the members could be moved through the furnaces and preheated prior to rolling or other treatment. During such movement, the members have usually rested on two types of supports. The first type were generally horizontally arranged sets of tubes of walking beam mechanisms, arranged in rows along the direction of travel through the furnaces. Certain of the sets of tubes moved in a predetermined pattern to move the slab longitudinally through the furnace. The second type of tube supports were stationary rail members along which the steel being preheated was moved by means of some suitable forcing or pushing structure, such as a ram. The temperature of either type of these tubes had to be maintained in a certain specified range to insure that the tubes had sufficient strength to bear the load of the members being preheated. Typically, water or some suitable fluid was pumped through the interior of the tubes to insure sufficient cooling to maintain the specified temperature range. With this technique, however, the fluid drew too much heat from the furnace.

In order to maintain the desired preheating temperature, the furnace was required to be driven to higher temperatures to compensate for heat loss due to the cooling effect of the fluid in the tubes. An undesirable effect of higher temperature in the furnace was the increase of oxidation and slag formation on the members being preheated. Attempts have been made to insulate the tubes with sleeves or coatings of vacuum cast insulation, castable and hard refractory insulation. However, with sleeves of these insulation materials, any pieces of slag falling from the steel members during movement and contacting the insulation readily penetrated the insulation, undesirably reducing the insulative capacity of the sleeves.

U.S. Pat. Nos. 3,952,470 and 4,001,996, of which applicant is inventor, have utilized refractory ceramic fiber modules as insulation for walls of furnaces. The refractory fiber material of these modules has good insulating properties at the temperatures encountered in preheating. However, it was generally considered that this type of fiber material did not lend itself to walking beam tube insulation due to problems with slag penetration of the type encountered with vacuum cast or hard refractory insulation.

SUMMARY OF INVENTION

Briefly, the present invention provides a new and improved insulated support beam, an insulation module for insulating the beam and a method of installing the module. The insulated support beam of the present invention is used for supporting a metal member, such as a steel slab, during movement of the member through a furnace, typically a preheating furnace, and includes a tube member, typically containing flowing water or other fluid, for supporting the member in the furnace. The beam is insulated by an insulating module according to the present invention in the form of a module of refractory fiber blanket material folded into layers extending between end folds and attachment or mounting members inserted in the folds of the module for mounting the module to the tube.

The modules of the present invention are installed by wrapping the blanket material about the tube and attaching the attachment members to the tube. Various attachment structures may be used according to the present invention, and provisions may be made to reduce the possible exposure of the ceramic fiber in the module to slag from the member being preheated. Provision may also be made for additional insulation of the tube.

DESCRIPTION OF PREFERRED EMBODIMENT

Figure 1:
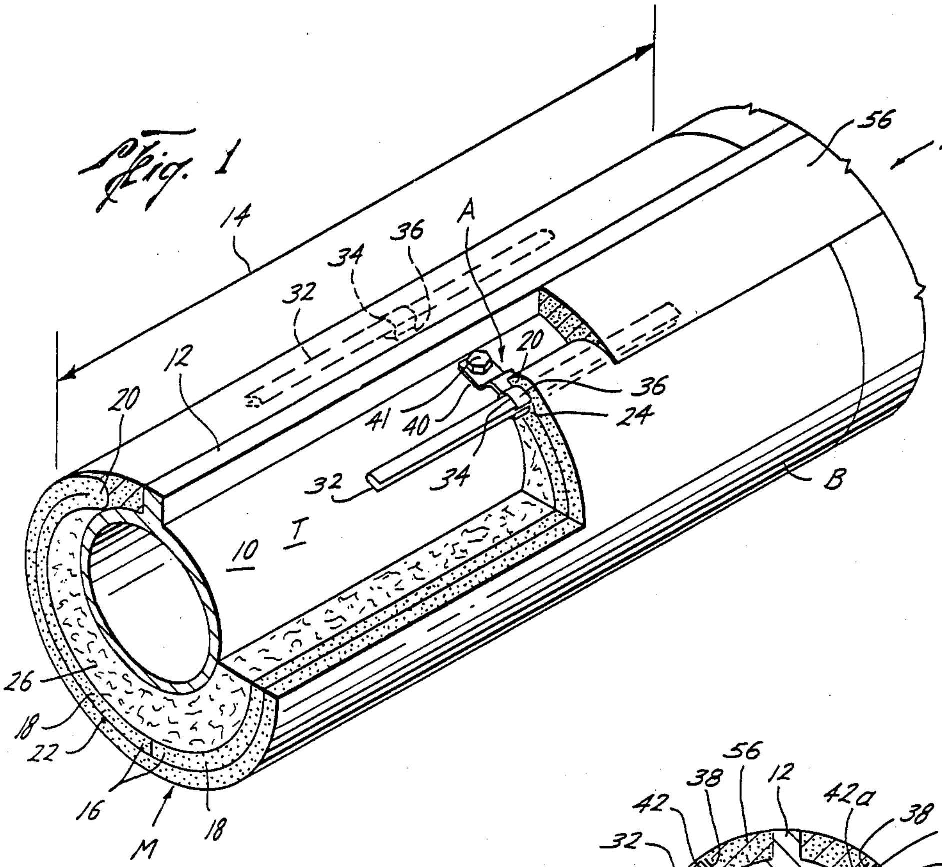
FIGS. 1 and 4 are isometric views of two insulated tube embodiments of the present invention.

In the drawings, a support beam S for supporting a metal member, such as a steel slab or rod or beam R, during movement of such member through a furnace such as a preheating furnace is set forth. The support S includes a module M formed from a blanket B of refractory ceramic fiber blanket material. Suitable such materials are, for example, the ceramic fiber blankets sold under the trademarks: "Cera-blanket" of Johns-Manville; "Fiber Frax" of Carborundum Company; and "Kaowool" of Babcox & Wilcox Company. The blanket B is attached or mounted to a tube T of the support S by mounting or attachment members A. Protective shielding material P is also provided to protect the fibers in the blanket B from slag and other particles which may fall from the metal members during movement through the furnace.

Considering the tube T more in detail, such tube is a part of any of several types of conventional walking beam arrangement or stationary support tube arrangement over which the metal slabs or members R move through a preheating furnace or other suitable heating chamber. In either type of support or tube, the tube T includes a generally cylindrical member 10 which is hollow in the interior to contain water or other suitable fluid which flows therethrough from a suitable pumping arrangement in order to cool the tube 10 to a level such that the metal from which it is formed has sufficient strength to withstand the loads of transporting the metal members through the furnace. The tube 10 typically includes a skid rail support member 12 on which the beam R rests when supported by the walking beam member in the furnace. In the past, the tubular members 10 have generally been uninsulated or covered with hard refractory insulation or vacuum cast insulation sleeves.

According to the present invention, the tube T is insulated by the blanket B of the type set forth above. The blanket B is typically in the form of a strip of suitable width, as indicated by an arrow 14, of refractory ceramic fiber blanket. The blanket B is formed into at least two layers beginning at starting end portions 16 and extending along an inner layer 18 to a substantially U-shaped end portions 20 and therefrom along a common, contiguous outer layer 22. A fold 24 is formed along the width of the blanket B between the inner layer 18 and the outer layer 22 within the end portion 20.

Figure 5:
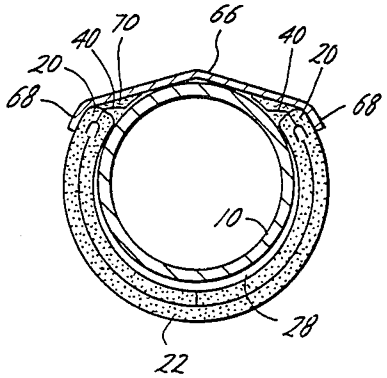
Figure 6:
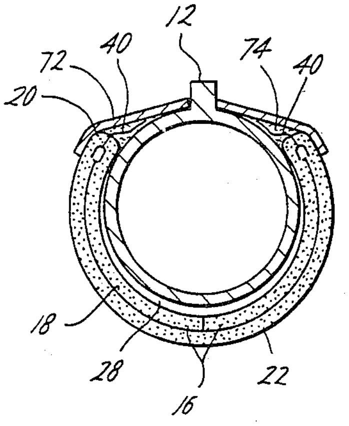

If desired, the length of the blanket B between the end portions 20 can be made to substantially exceed the circumference of the tube T, so that when the blanket B is attached or mounted to the tube T, a pocket or pouch is formed beneath the tube T. The pocket may be of any suitable size and may receive refractory fiber insulating material 26 therein depending upon the insulation requirements, or may be a small, unfilled air gap 28 (FIGS. 4–6) to permit thermal expansion differential compsensation. Further, it should be understood that the blanket B may in certain instances be snugly fit to the exterior of the tube T.

A first embodiment (FIG. 1) of the attachment members A includes a support beam in the form of a rod or bar 32, which may be of any of the types set forth in U.S. Pat. Nos. 3,952,470 and 4,001,996 previously discussed of which appliclant is the inventor. One of the bars 32 is mounted in each of the folds 24 and extends a suitable supporting length along at least a portion of the fold 24 within the blanket B with a center portion 34 of the rod 32 positioned approximately at a mid-point along the width of the module M.

An attachment tab 36 is mounted at the center portion 34 of the rod 32 at an inner end. A lug or blade member 40 of the tab 36 pierces the end portion 20 of the blanket B and extends outwardly therefrom and is adapted to be bent or moved into a position contacting the external periphery of the tube T for mounting by some suitable technique, such as welding or bolting by a bolt 41.

Figure 2:
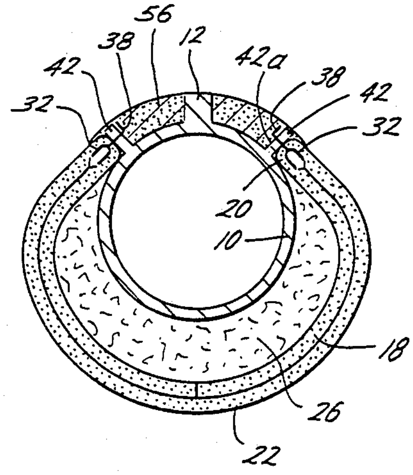
FIGS. 2, 3, 5 and 6 are each vertical sectional view of other insulated tube embodiments of the present invention.
Figure 3:
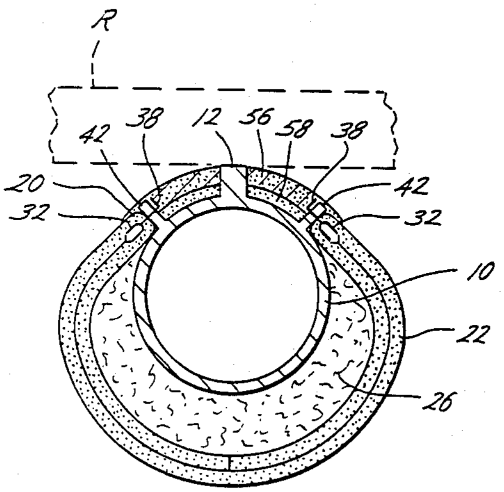

Certain tubes T may have mounting rib or rail members 42 (FIGS. 2 and 3) formed on side portions thereof. In these situations, the blade members 38 may be welded to the mounting ribs 42 after being bent to conform thereto after passing through a suitable opening formed in the rib member 42 to an upper surface 42*a*.

Another embodiment of an attachment members A according to the present invention (FIG. 4) includes support beams 44 extend along the length of the folds 24 and include outer portions 46 extending outwardly from the sides of the blankets B at their side edges 48. Certain portions of the blanket B in FIG. 4 have been removed from the drawing to more clearly show the attachment structure A. Attachment tabs 50 extending parallel to the side surface of the skid rail 12 are formed at outer end portions 46 of the support beam 44. The tabs 50 for attaching the blanket B are attached by a pin or bolt 52 or other suitable fastening means to the skid rails 12. The pin or bolt 52 passes through holes 54 in the attachment tab 50. The holes 54 in the attachment tab 50 are preferably in the form of slots to permit compensation for thermal expansion differential between the tube 10 and the support beams 44.

As has been set forth above, refractory ceramic fiber blanket materials have previously been considered unsatisfactory for use in preheat furnaces due to the lack of resistance to slag and other particles. However, with the present invention, insulating modules M for the support tubes 10 are formed which afford the insulating capabilities of the cermaic fiber blanket materials while protective structure P is provided to prevent substantial damage to the fiber materials from slag from the slabs in the furnaces.

For example, as can be seen in FIG. 1, the attachment tabs A mounting the module M onto the tube 10 are located at positions so that the module M encloses less than the entire circumference of the tube 10, leaving portions of the tube 10 unenclosed or uncovered between the end portions 20 of the blanket B and the skid rail 12. The amount of this uncovered space on the tube 10 may vary according to the desired degree of protection of the blanket B from slag. With the present invention this space is filled with a protective coating in the form of a refractory mortar 56. Usually, at least the end portions 20 of the blanket B are also covered with the mortar 56 for protective purposes. A suitable such mortar is the alumina-chromic oxide, phosphate bonded mortar sold as "Jade Set Super" by A. P. Green Refractories Co. of Mexico, Mo. Such a mortar is applied by a trowel or other suitable technique and thereafter air sets for hardness. Once hardened, a protective insulative coating is formed about the periphery of the tube 10 unenclosed by the blanket B. Where the tube member 10 includes mounting rib members 42 (FIG. 2), the space between the skid rail 12 and the rib members 42 may be filled with the mortar 56. Further, end portions 20 of the blanket B are covered with a layer of the mortar 56 for insulative/protective purposes. If desired (FIG. 3), a layer of ceramic fiber blanket or insulating material 58 may be mounted on the tube 10 between the skid rail 12 and the mounting rib members 42 prior to application of the mortar 56 to increase the insulative capacity of the support S.

In certain other situations (FIG. 4), the protective structure P may take the form of a plate or shield 60 having an inner lip 62 inserted between the skid rail 12 and the end portions 20 of the blanket B. The shield further includes a cover member 64 extending over and covering the blanket B for an extent determined by the desired amount of protection.

A protective plate 66 (FIG. 5) may also be utilized. The plate 66 is mounted to a top portion of the pipe 20 by welding or the like and extends outwardly to lip members 68 which cover the end portions 20 of the blanket B, again with the extent of such coverage being determined by the amount of protection desired. Further, if desired, the space, if any, between the tube 10 and the plate 66 may be filled with ceramic fiber insulating stuffing or strips 70.

Another type of protective structure (FIG. 6) of the present invention is in the form of protective plate member 72 bolted or welded to the tube 10 on each side of the skid rail 12 and extending outwardly to cover the end portions 20 of the blanket B to the desired extent. Refractory ceramic fiber insulating stuffing or strips 74 may be inserted to fill any voids or gaps between the plate 72 and the tube 10. The protective plate 72 may be attached to the tube 10 by bolting or by welding as desired.

In installing insulating modules according to the present invention to form the support S, an initial module M (FIG. 1) is mounted at a suitable starting point on the tube 10 by wrapping the blanket B about the tube 10 and attaching the attachment members A to the external surface of the tube 10. Another module M is then placed abutting the installed module in a similar manner. The installation of the module continues until the tube 10 has received insulating modules M along its entire length. The modules M may be trimmed in width for fitting purposes, if necessary. The mortar 56 may be applied during or after attachment of the modules M to the tube 10.

Figure 4:
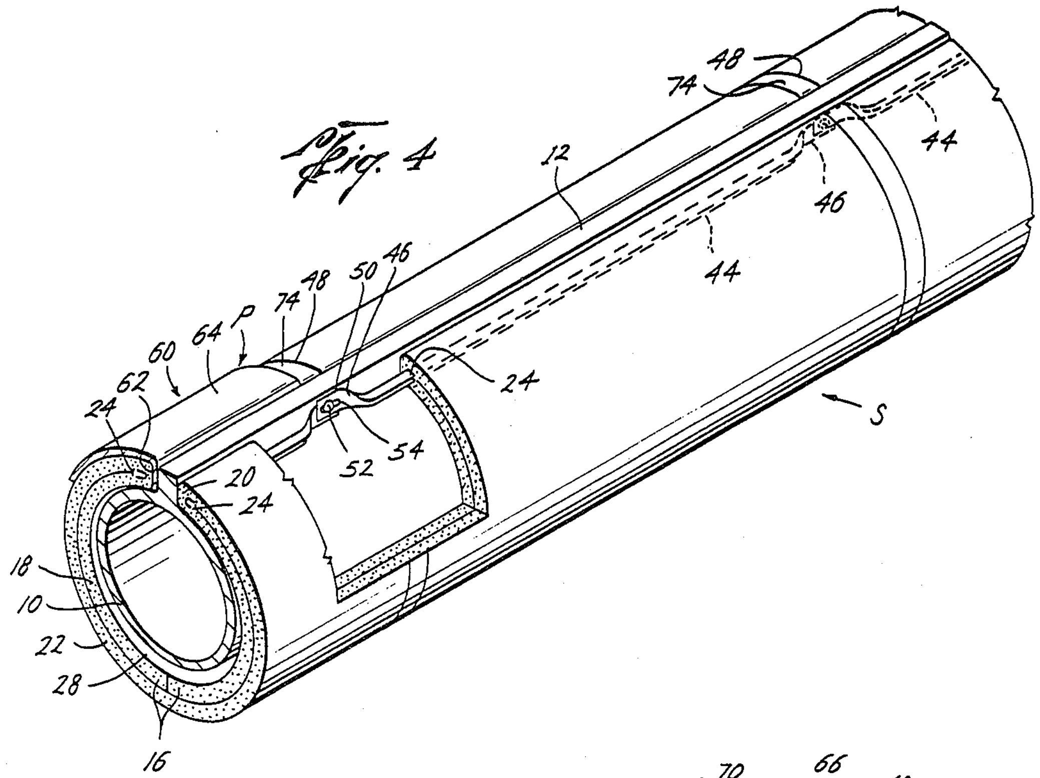

Installation of the module M of the type shown in FIG. 4 is similar to the foregoing method of installation. Adjacent modules M are positioned on the tube 10 and their attachment tabs 50 moved into alignment so that the pins or bolts 52 may pass through the slotted holes 54. The annular space between adjacent modules M is then filled with a strip of ceramic fiber blanket 74 which may be glued or otherwise fixed into place. Protective coverings of the type shown in FIGS. 4 through 6, inclusive, may also be installed concurrently with or after installation of the modules M.

With the present invention, a substantial problem in the industry has been solved. Further, with the present invention, an unexpected result is obtained. By insulating all of the tube 10 except the skid rail 12, where such a rail is formed on the tube 10, the amount of heat transferred from the furnace to the cooling fluid in the interior of the tube T is reduced due to the insulating effect of the refractory ceramic fiber blanket B. Thus, the cooling fluid in the tube T only has to remove that heat which it receives through the skid rail 12 or the metal protective structure. In this manner, substantially less cooling fluid flow is required. Prior to the present invention, the uninsulated tube T drew substantial heat from the furnace and therefore required that the furnace be driven to higher heat levels in order to provide adequate heat. However, as has been set forth, the higher heat levels to insure adequate heating of the beams or bars only increased the oxidation and slag problem.

The foregoing disclosure and description of the invention are illustrative and explanatory thereof and various changes in the size, shape and materials as well as in the details of the preferred embodiment may be made without departing from the spirit of the invention.

I claim:

1. A method of installing refractory ceramic fiber module, composed of a folded blanket of refractory ceramic fiber extending between two end folds and having attachment members extending outwardly from said folds, to a support tube which supports a metal member during movement of the member in a furnace comprising the steps of:

(a) wrapping the blanket of the module about the tube; and (b) attaching the attachment members to the tube.

2. The method of claim 1, wherein said step of attaching comprises:

welding the attachment members to the tube.

3. The method of claim 1, wherein said step of attaching comprises:

bolting the attachment members to the tube.

4. The method of claim 1, wherein said step of attaching comprises:

attaching the attachment members to the tube at positions leaving portions of the tube uncovered by the blanket.

5. The method of claim 4, further including the step of:

insulating the uncovered portions of the tube.

6. The method of claim 5, wherein said step of insulating comprises:

applying a refractory mortar to the uncovered portions of the tube.

7. The melthod of claim 5, wherein said step of insulating comprises:

(a) applying an inner layer of refractory ceramic fiber blanket to the uncovered portions of the tube; and (b) covering the inner layer with a refractory mortar.

8. The method of claim 5, wherein sad step of insulating comprises:

(a) applying refractory blanket stuffing to cover at least a portion of the uncovered portion of the tube;

(b) covering the stuffing with a protective member; and (c) attaching the protective member to the tube.

9. The method of claim 5, wherein said step of insulating comprises:

(a) applying refractory blanket stuffing to cover at least a portion of the uncovered portion of the tube;

(b) covering the stuffing and portions of the blanket with a protective member; and (c) attaching the protective member to the tube.

10. The method of claim 1, further including the steps of:

(a) forming a pocket between the blanket and the tube during said step of wrapping; and (b) inserting refractory fiber insulation material into the pocket so formed.

11. The metod of claim 1, wherein the tube has a skid rail member extending upwardly therefrom and the attachment members extend along the length of the folded blanket and outwardly from the blanket, at its ends and said step of attaching comprises:

attaching the attachment members to the skid rail member.

12. The method of claim 1, wherein the attachment members extend outwardly through the blanket from the folds, and said step of attaching comprises:

attaching the attachment members to the tube at positions leaving portions of the tube uncovered by the blanket.

13. The method of claim 1, wherein the attachment members extend outwardly through the blanket from the folds, and the tube has mounting ribs extending outwardly from side portions thereof, and said step of attaching comprises:

attaching the attachment members to the mounting ribs.

* * * * *

UNITED STATES PATENT AND TRADEMARK OFFICE
CERTIFICATE OF CORRECTION

PATENT NO. : 4,393,569

DATED : July 19, 1983

INVENTOR(S) : Carlisle O. Byrd, Jr.

It is certified that error appears in the above-identified patent and that said Letters Patent are hereby corrected as shown below:

On the title page:
Please delete "DEFRACTORY" in the title of the above patent and insert therefor --REFRACTORY--.

In Column 1, in the title, please delete "DEFRACTORY" and insert therefor --REFRACTORY--.

Signed and Sealed this

*Twenty-seventh* Day of *September 1983*

[SEAL]

*Attest:*

GERALD J. MOSSINGHOFF

*Attesting Officer* *Commissioner of Patents and Trademarks*